(12) United States Patent
Tatamiya

(10) Patent No.: US 6,327,438 B1
(45) Date of Patent: Dec. 4, 2001

(54) OPTICAL SYSTEM OF DATA IMPRINTING DEVICE

(75) Inventor: Hisashi Tatamiya, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/464,442

(22) Filed: Dec. 16, 1999

(30) Foreign Application Priority Data

Dec. 21, 1998 (JP) .................................................. 10-362615
Dec. 21, 1998 (JP) .................................................. 10-362761

(51) Int. Cl.⁷ .................................................. G03B 17/24
(52) U.S. Cl. ............................................................ 396/315
(58) Field of Search .................................... 396/310, 315, 396/311, 267, 317

(56) References Cited

U.S. PATENT DOCUMENTS 5,469,237 * 11/1995 Itoh et al. .............................. 354/106
6,044,231 * 3/2000 Soshi et al. ........................... 396/315

* cited by examiner

*Primary Examiner*—Christopher E. Mahoney
(74) *Attorney, Agent, or Firm*—Greenblum & Bernstein, P.L.C.

(57) ABSTRACT

A data imprinting device for camera is provided with a shaft that rotatably supports the sprocket which is rotated as a film is fed, a light emitting device that emits a plurality of light beams, and an optical system for converging the light beams on the film. The light emitting device is provided to the shaft. The light emitting device is provided at the top of the shaft, and an optical path is defined inside the shaft, along its central axis, from the light emitting device. The optical path is bent at the lower portion of the shaft such that the light beams are incident on the film, via an opening formed on the shaft, to form beam spots arranged in a width direction of the film.

14 Claims, 7 Drawing Sheets

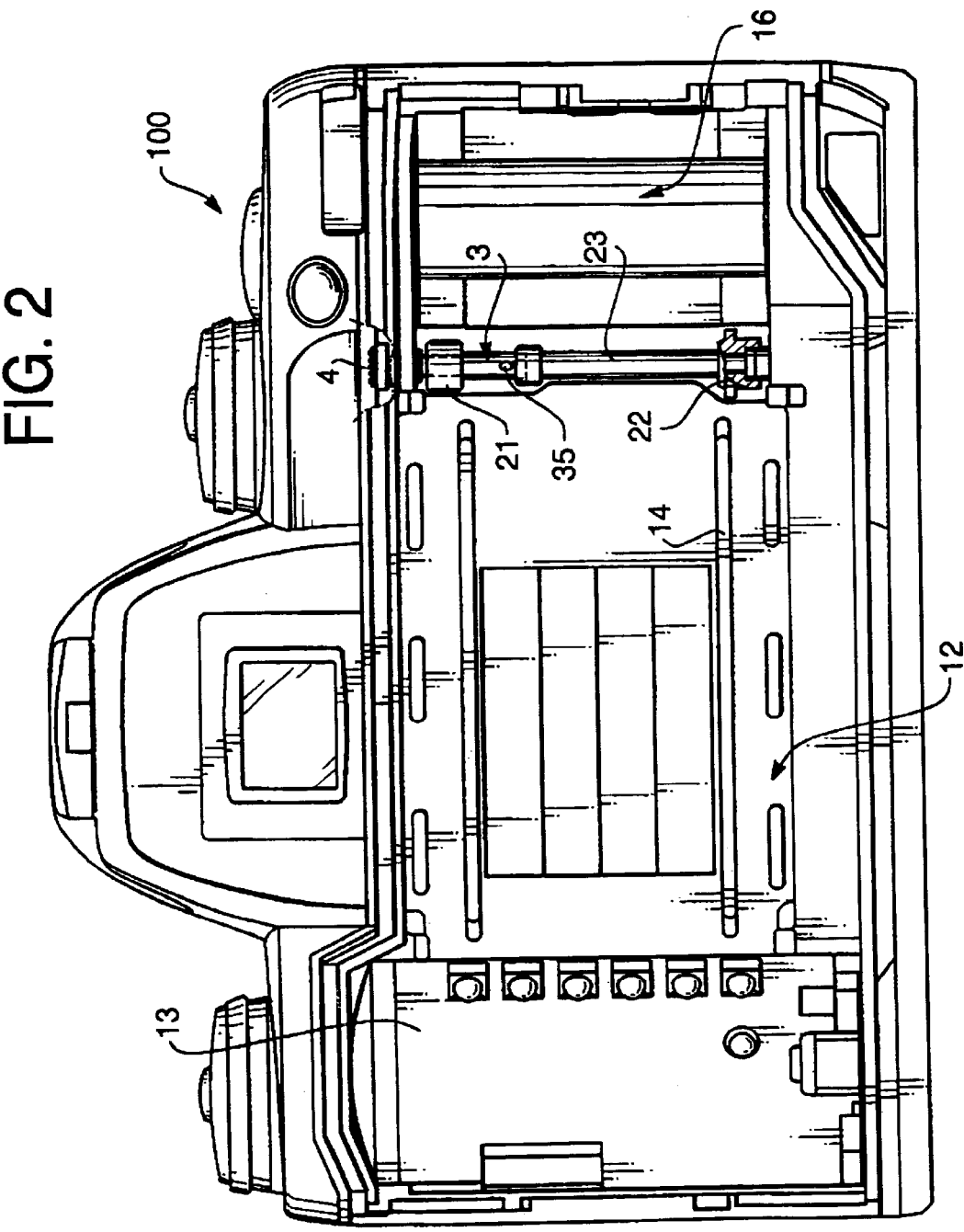

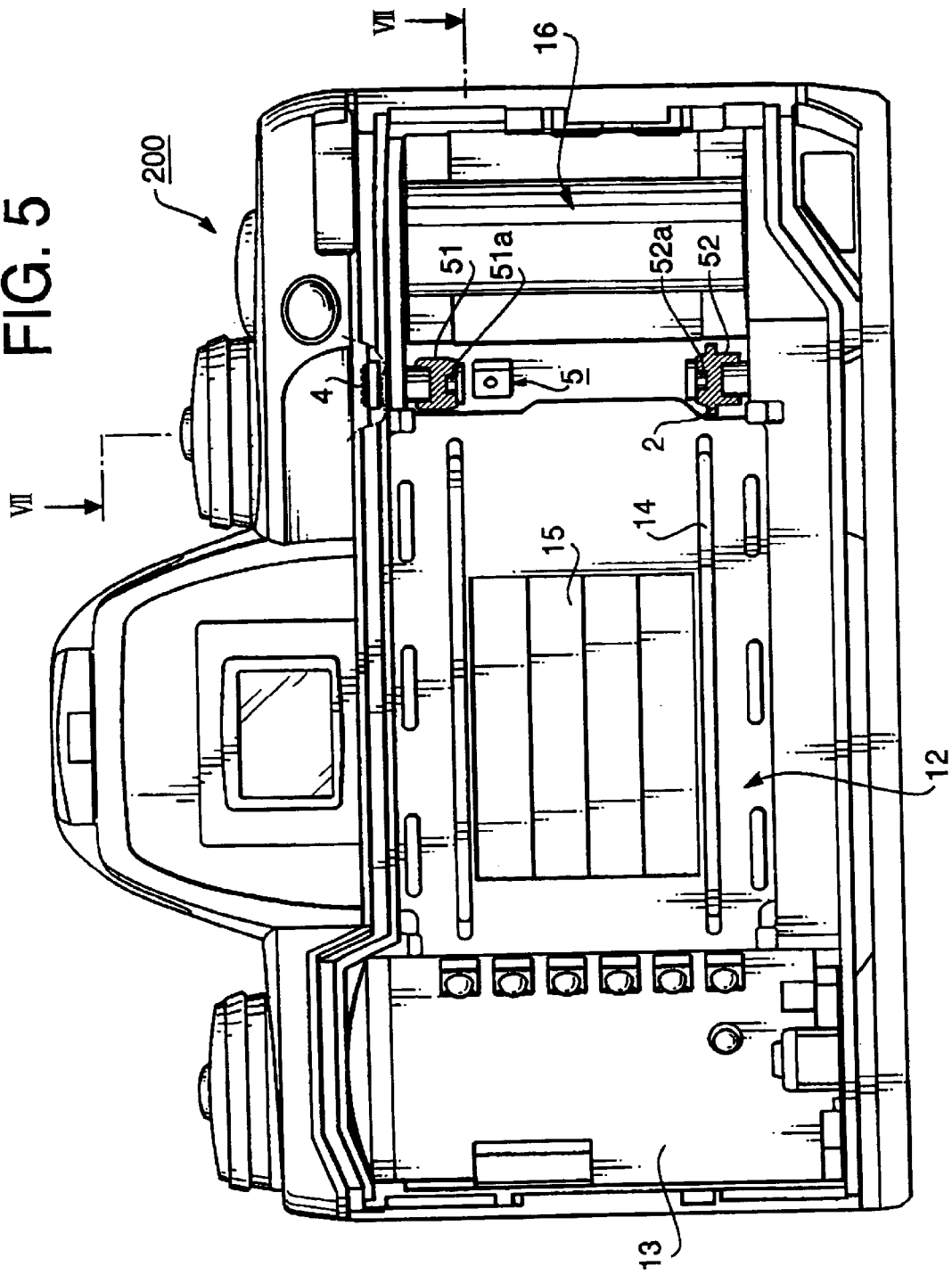

OPTICAL SYSTEM OF DATA IMPRINTING DEVICE

BACKGROUND OF THE INVENTION

The present invention relates to a data imprinting device, which forms data such as date and time of photographing on a film, for a camera.

Conventionally, cameras are generally provided with data imprinting devices for imprinting data such as a date, time or the like on a film. A typical example of such a data imprinting device may be provided with an LED (Light Emitting Diode) array and an optical system which converges the light emitted by the LED array to form a plurality of beam spots on the film. Generally; the data imprinting device is provided in a camera body and the optical image of the data to be printed formed on a film emulsion side of a film. Alternatively, the data imprinting device is provided to a back cover of the camera and the optical image is formed on a back surface of the film.

When the data imprinting device is provided in the camera body, since the recent cameras are generally designed to avoid unnecessary space for downsizing, an extra space is required for accommodating the data imprinting device, and accordingly, the size of the camera should be made larger. When the data imprinting device is mounted on the back cover of the camera, the thickness of the back cover may increase. In either case, downsizing of cameras is prevented.

SUMMARY OF THE INVENTION

It is therefore an object of the invention to provide an improved data imprinting device which can be implemented in a camera without preventing downsizing of the camera.

For the object, according to the invention, there is provided a data imprinting device for camera, the camera being provided with a sprocket that engages feed holes of a film, comprising; a shaft that rotatably supports the sprocket; a light emitting device that emits a plurality of light beams, the light emitting device being provided to the shaft, an optical path being defined, in the shaft, from the light emitting device toward the film; and an optical system that is provided within the optical path that converges the plurality of light beams onto the film.

Since the optical path is defined in the shaft, and the optical system is provided inside the shaft, an extra space therefor is unnecessary, which contributes to downsizing of cameras.

Optionally, the camera is provided with another sprocket which is also driven to rotate as the film is fed, and a film feeding amount detection system which detects a feeding amount of the film in accordance with a driven amount of the another sprocket.

The data imprinting device is further provided with another shaft that is integrally formed with the another sprocket, the shaft and another shaft being co-axially arranged along a rotational axis thereof.

The light emitting device may be provided at an end portion, along a rotational axis, of the shaft. In such a case, the shaft may extend in parallel with a film surface, and an opening is formed on the shaft at a portion facing the film surface. The light beams emitted by the light emitting device proceed along a central axis of the shaft. The optical system may include a deflecting member which deflects the light beams emitted by the light emitting device toward the film surface via the opening.

Optionally, the light emitting device may include a light emitting diode.

Further optionally, the light emitting device may include a plurality of light emitting elements which are arranged such that beam spots formed on a film surface are arranged in a width direction of the film.

According to another aspect of the invention, there is provided a data imprinting device for a camera, that is provided with: first and second sprockets engaging feed holes formed on both sides, in a width direction, of a film, a first shaft that rotatably supports the first sprocket, a second shaft that supports the second sprocket, a light emitting device arranged between the pair of sprockets, the light emitting device emitting a plurality of light beams, and an optical system that is provided between the light emitting device and the film, the optical system converging the plurality of light beams on the film.

Since the shaft connecting the two sprockets is omitted and the imprinting device is arranged at the thus obtained room, an extra space for the data imprinting device is unnecessary, which contributes to downsizing of the camera.

Optionally, the camera may include a body having a film winding section provided with a film winding spool, and a central portion including at least a shutter mechanism. Further, the light emitting device and the optical system are provided between the film winding section and the shutter mechanism.

Further optionally, the light emitting device may include a plurality of light emitting elements which are arranged such that the beam spots formed on a film surface are arranged in a width direction of the film.

According to a further aspect of the invention, there is provided a camera, provided with: a sprocket engaging feed holes of a film: a shaft that rotatably supports the sprocket; a light emitting device that emits a plurality of light beams, the light emitting device being provided to the shaft, an optical path being defined, in the shaft, from the light emitting device toward the film; and an optical system that is provided within the optical path to converge the plurality of light beams on the film to form a plurality of beam spots thereon.

According to still further aspect of the invention, there is provided a camera, which is provided with: first and second sprockets engaging feed holes formed on both sides, in a width direction, of a film; a first shaft that rotatably supports the first sprocket; a second shaft that supports the second sprocket; a light emitting device arranged between the pair of sprockets, the light emitting device emitting a plurality of light beams; and an optical system that is provided between the light emitting device and the film, the optical system converging the plurality of light beams on the film.

BRIEF DESCRIPTION OF THE ACCOMPANYING DRAWINGS

FIG. 2 is a rear view of the camera shown in FIG. 1;

FIG. 5 is a rear view of the camera shown in FIG. 4;

DETAILED DESCRIPTION OF THE EMBODIMENTS

Hereinafter, the present invention will be described in detail with reference to the accompanying drawings.

[First Embodiment]

Figure 1:
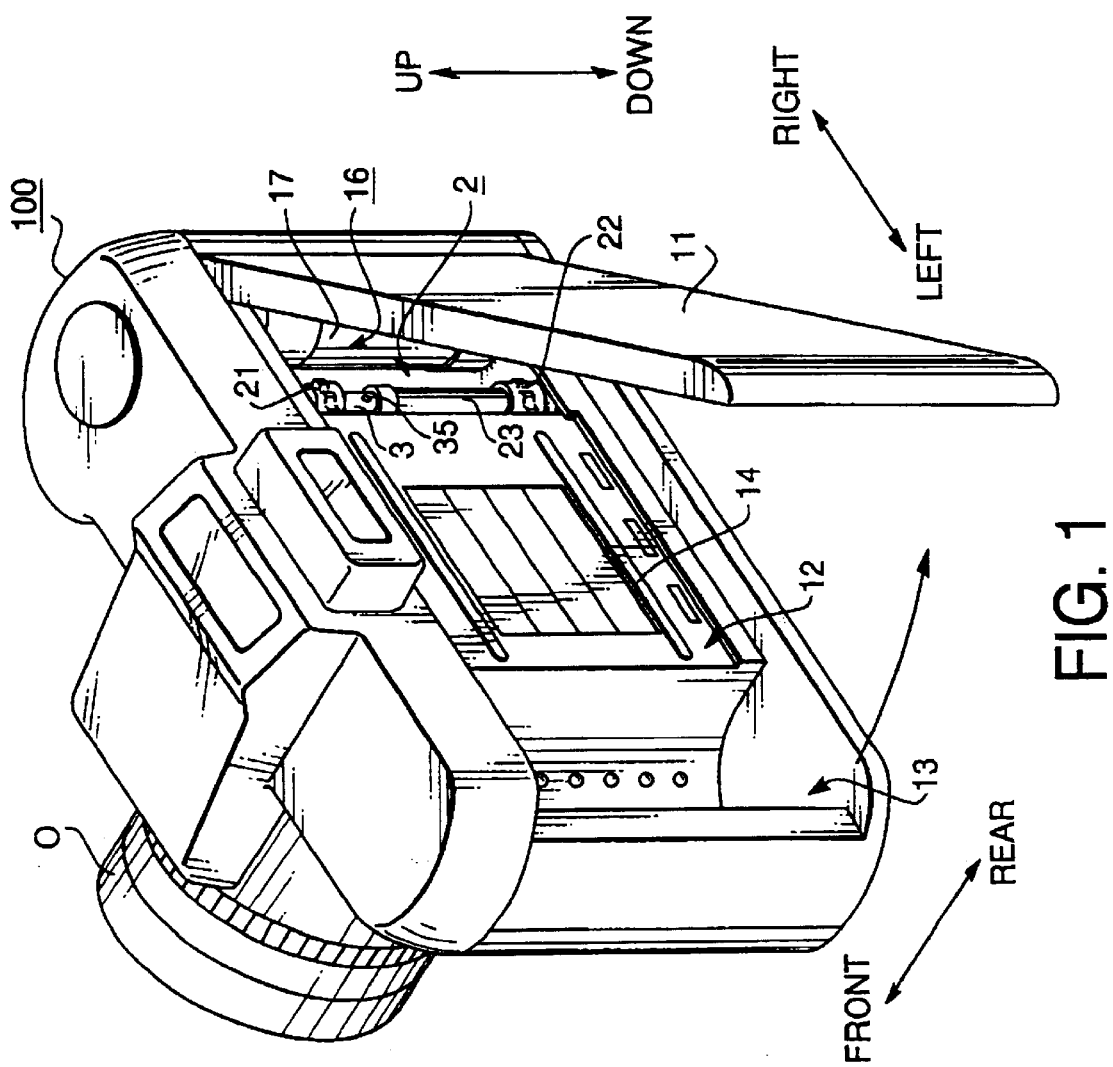
FIG. 1 is a perspective view of a camera according to a first embodiment of the invention.

FIG. 1 is a perspective rear view of a camera 100, with its back cover 11 opened, according to a first embodiment of the invention. In this specification, a side where a photographing lens O is provided is referred to as a front side of the camera 100, and a side where the back cover 11 is provided is referred to as a rear side of the camera 100. Further, right and left sides of the camera are defined as right-hand and left-hand sides of a user of the camera 1 when the camera 1 is held for a landscape photographing. Therefore, the right-hand side of the camera 1 in FIG. 1 is the right side of the camera, and the left-hand side of the camera 1 in FIG. 1 is the left side of the camera. The up and down sides are defined similarly, i,e., the up and down sides of the camera 100 are the up and down sides in FIG. 1.

In the left side portion of a body 12 of the camera 100, a film cartridge chamber 13 for accommodating a film cartridge (not shown) is formed. In the right side portion of the body 12, a film winding unit 16 is provided for taking up the film from the film cartridge accommodated in the film cartridge chamber 13. The film winding unit 16 includes a winding spool 17 which is driven to rotate for winding the film. The film withdrawn from the film cartridge at the film cartridge chamber 13 is guided by a pair of guide rails 14, which extend in the right-left direction of the camera 100, and wound by the winding spool 17.

FIG. 2 is a rear view of the camera 100 with the back cover 11 removed. In order to detect the feeding amount of the film, a pair of sprockets 21 and 22 are provided at the left-hand side of the film winding mechanism 16. As shown in FIG. 3, the sprockets 21 and 22 have a plurality of projections 21a and 22a, respectively. The projections 21a and 22a engage with feed holes formed on both sides, in the width direction, of the film, and when the film is fed, the projections 21a and 22a are driven to rotate together with the sprockets 21 and 22.

Figure 3A:
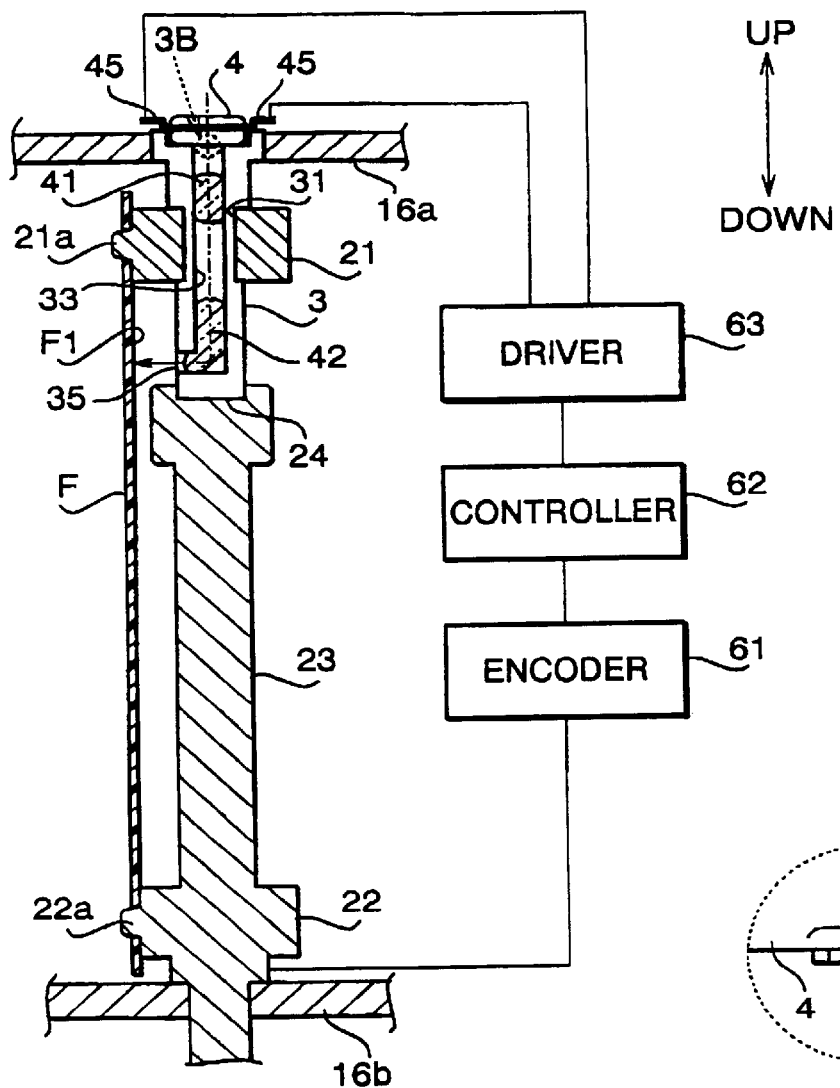
FIG. 3A is a cross sectional side view around sprockets.

FIG. 3A shows an enlarged cross sectional view around the sprockets 21 and 22 of the camera 100. From an upper inner surface 16a of the film winding mechanism 16, a cylindrical shaft 3 extends in the up-down direction of the camera 100. At a central portion, in the longitudinal direction, of the shaft 3, a smaller diameter portion 31 is formed. The upper sprocket 21 is slidably and rotatably supported by the shaft 3. The lower sprocket 22 is formed integrally with a shaft 23 which is arranged co-axially with respect to the shaft 3. A top end of the rotation shaft 23 is formed to be a bearing portion 24 for slidably receiving the lower end of the shaft 3. The lower end of the rotation shaft 23 is rotatably supported by a lower plate 16b of the winding mechanism 16. When the film is fed from the left side to the right side, an encoder 61 connected to a lower portion of the shaft 23 outputs pluses synchronously with rotation of the shaft 23. A controller 62 of the camera 1 controls the feeding of the film in accordance with the pulses output by the encoder 61.

Next, a data imprinting device will be described.

Inside the shaft 3, an optical path 33 is formed along the central axis of the shaft 3. Specifically, the path 33 extends from the top end to the lower end of the shaft 3. At the lower end portion of the shaft 3, an opening 35 is formed on the circumference of the shaft 3 to view the film F, and the optical path is bent by 90 degrees so that light directed along the central axis of the shaft 3 is directed toward a film surface F1 on which a silver-salt film emulsion is provided. At the upper end of the shaft 3, an LED (light emitting diode) 4 is provided. In the path 33, a lens 41 for converging the light emitted by the LED 4 on the film surface F1, and a prism 42 for deflecting the light emitted by the LED 4 toward the film surface F1 are provided. The LED 4 is connected to the controller 62 with lead wires 45, via a LED driver 63.

Figure 3B:
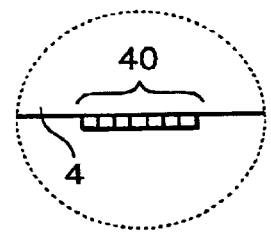
FIG. 3B is an enlarged view illustrating light emitting elements.

As shown in FIG. 3B, the LED array 4 includes seven light emitting elements 40 which are arranged in a front-rear direction of the camera 100. The light emitted by the seven light emitting elements 40 are converged by the lens 41 and seven beam spots are formed on the film emulsion surface F1, with arranged in the width direction of the film F. Thus, when the film F is fed, by selectively driving the seven light emitting elements 40 to emit light beams, a two-dimensional image, such as a date or time, can be imprinted on the film surface F1.

[Second Embodiment]

Figure 4:
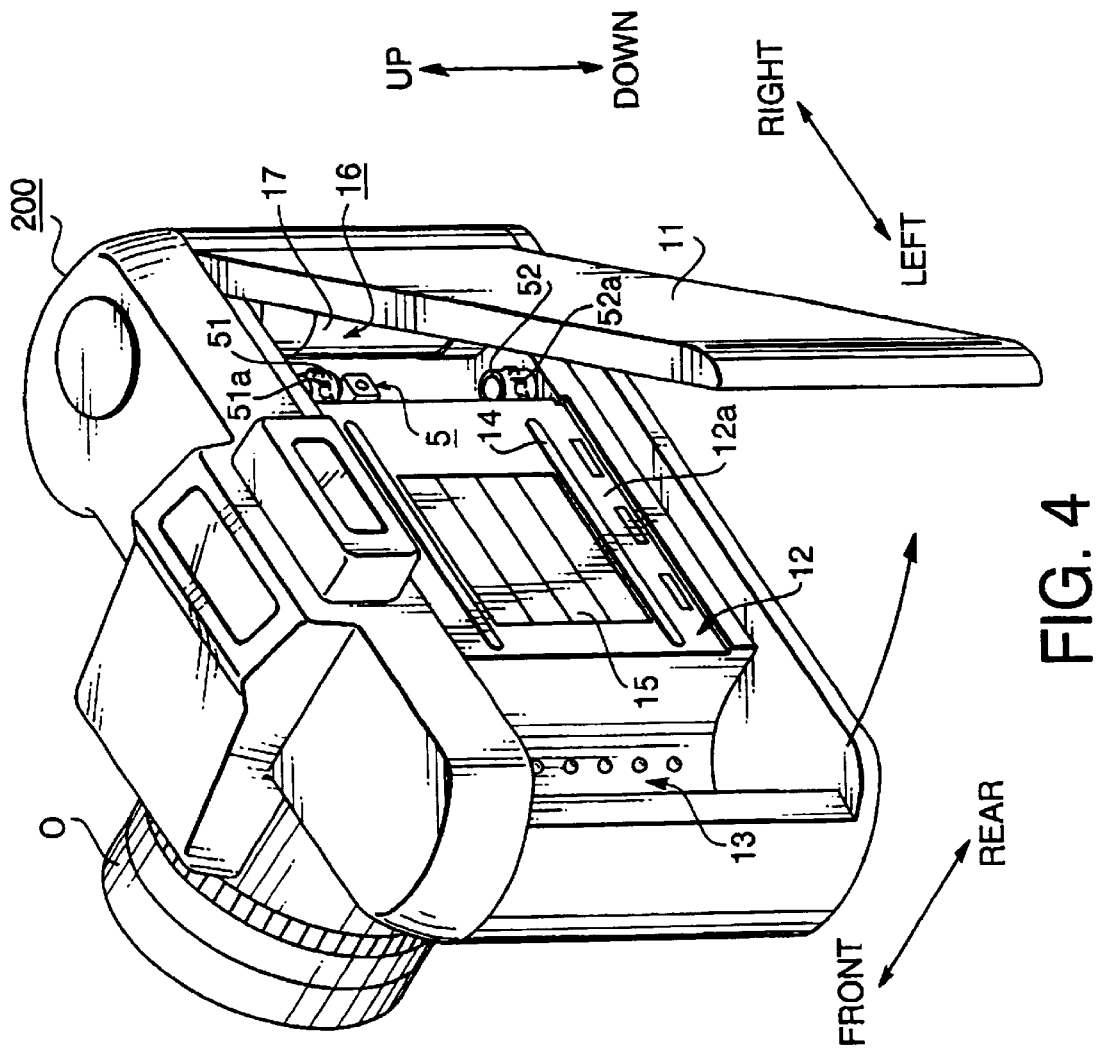
FIG. 4 is a perspective view of a camera according to a second embodiment of the invention.

FIG. 4 is a perspective rear view of a camera 200, with its back cover 11 opened, according to a second embodiment of the invention.

The camera 200 is similar to the camera 100 of the first embodiment except that the structure of the sprockets is different. Therefore, for simplicity, the members which are similar to those in the first embodiment are assigned the same reference numbers, and description thereof will be omitted. Definition of directions are similar to that in the first embodiment.

Figure 6A:
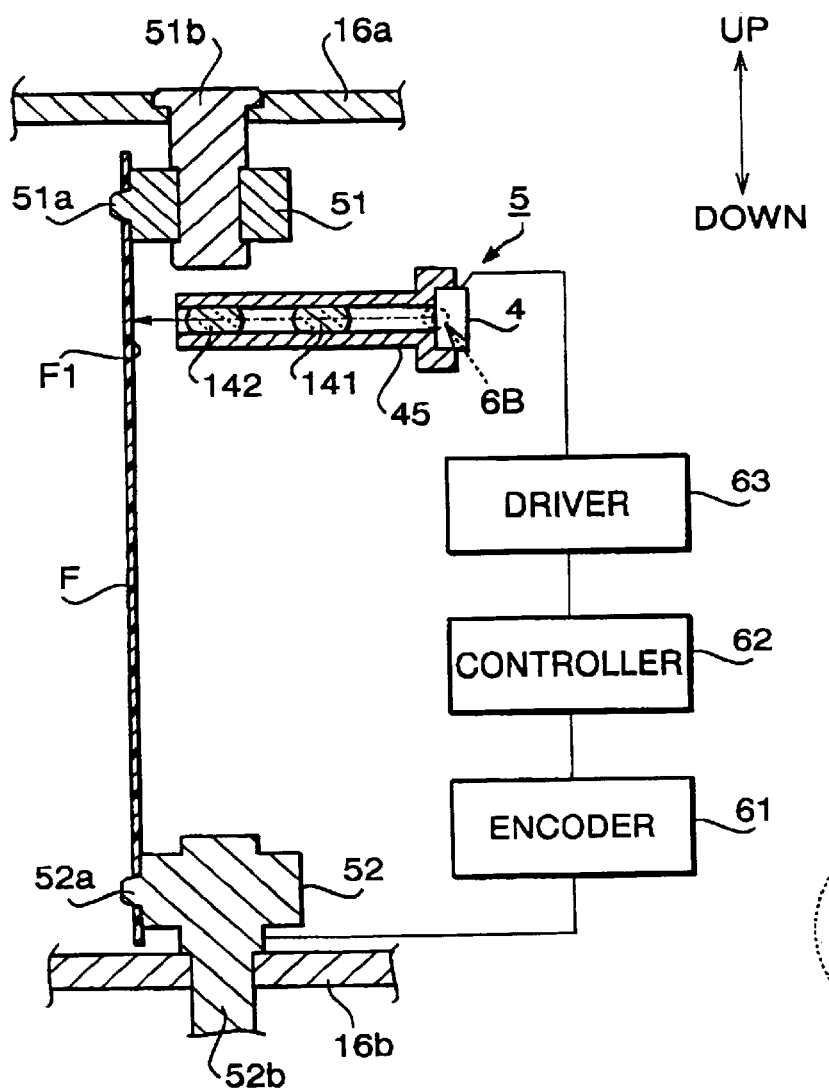
FIG. 6A is a cross sectional side view around sprockets.

FIG. 5 is a rear view of the camera 200 with the back cover 11 removed. In order to detect the feeding amount of the film, a pair of sprockets 51 and 52 are provided on the left-hand side of the film winding section 16. As shown in FIG. 6A, the sprockets 51 and 52 have a plurality of projections 51a and 52a, respectively. The projections 51a and 52a engage with feed holes formed on both sides, in the width direction, of the film F, and when the film is fed, the projections 51a and 52a are driven to rotate together with the sprockets 51 and 52.

FIG. 6A shows an enlarged cross sectional view showing the sprockets 51 and 52 of the camera 200. The upper sprocket 51 is rotatably supported to an upper frame 16a of the body 12 by a first supporting shaft 51b. The lower sprocket 52 is formed integrally with a second supporting shaft 52b, and the shaft 52b is rotatably supported by the lower frame 16b of the camera body 12. The shaft 52b is connected to an encoder 61, and when the film is fed from the left side to the right side, the encoder 61 outputs pluses synchronously with rotation of the shaft 52b. A controller 62 of the camera 200 controls the feeding of the film in accordance with the pulses output by the encoder 61.

It should be noted that the sprockets 51 and 52 are co-axially arranged, but spaced apart from each other. As clearly shown in FIGS. 4–6A, a data imprinting device 5 is provided between the sprockets 51 and 52.

Figure 7:
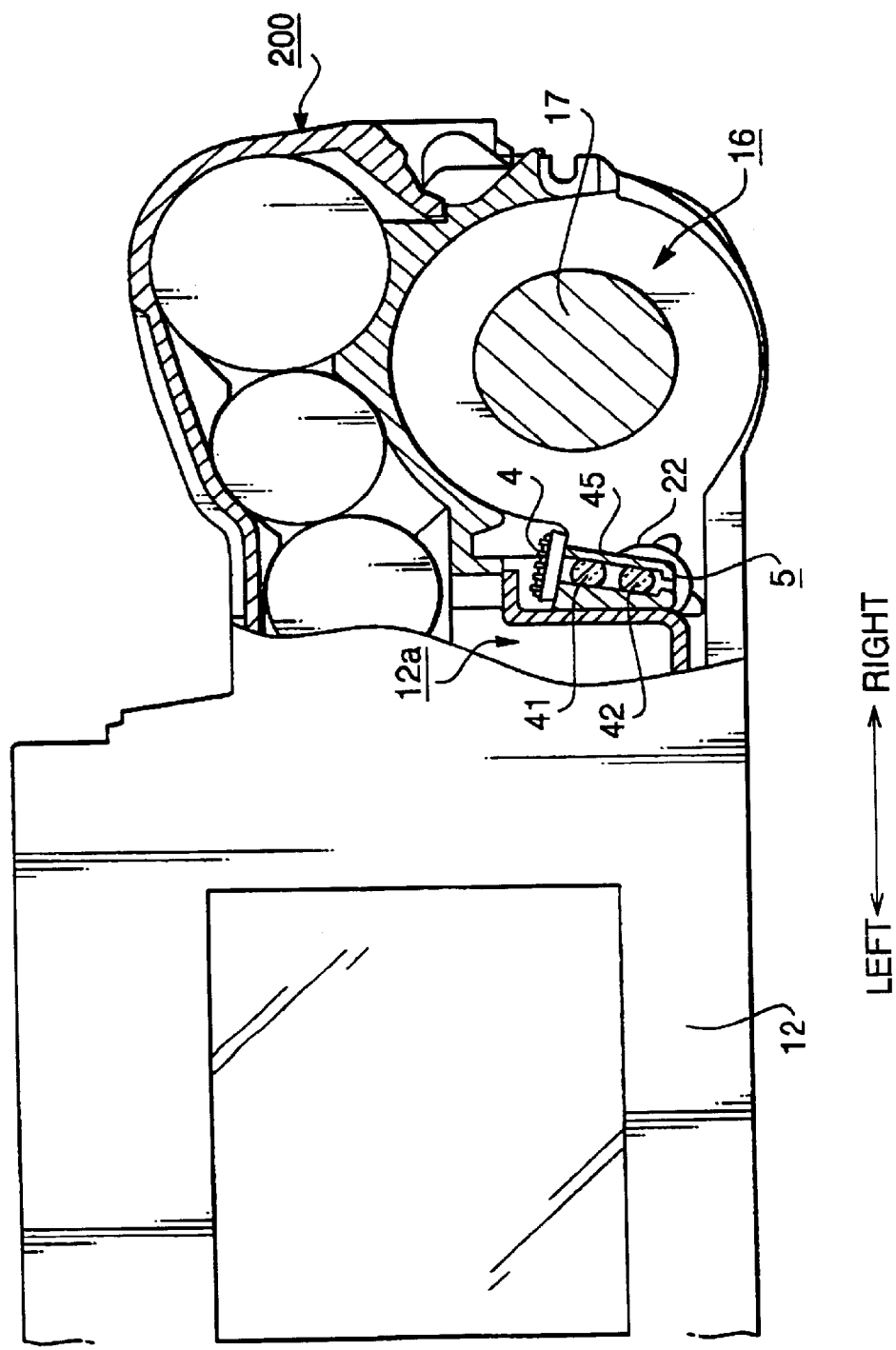
FIG. 7 is a cross sectional side view of a film winding unit.

FIG. 7 is a cross sectional top view taken along line VII—VII of FIG. 5. The data imprinting device 5 is provided at a space between the central portion 12a, where a shutter mechanism 15 and the film winding section 16 are provided. In a conventional camera, a shaft connecting the upper and lower sprockets 51 and 52 is located at the position between the shutter mechanism and the film winding section. According to the second embodiment, however, since the upper and lower sprockets 51 and 52 are supported separately, and therefore, it is possible to arrange the data imprinting device 5 between the sprockets 51 and 52.

As shown in FIG. 6A, the data imprinting device 5 includes an LED (light emitting diode) 4, and lenses 141 and 142 for converging the light emitted by the LED 4 on the film surface F1. The LED 4 and the lenses 141 and 142 are arranged along a direction perpendicular to the film surface, and supported by a holder 45 which is integrally formed on an inner wall of the film winding section 16. The LED 4 is connected to the controller 62 via a LED driver 63.

Figure 6B:
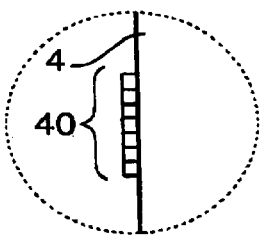
FIG. 6B is an enlarged view illustrating light emitting elements.

As shown in FIG. 6B, the LED 4 includes seven light emitting elements 40 which are arranged in an up/down direction of the camera 200. The light emitted by the seven light emitting elements 40 are converged by the lenses 141 and 142, and seven beam spots, which are arranged in the width direction of the film F, are formed on the film surface F1 bearing the film emulsion. Thus, when the film F is fed, by selectively driving the seven light emitting elements 40 to emit light, a two-dimensional image, such as a date, can be imprinted on the film surface F1.

As above, according to the first and/or second embodiments, it is possible to employ the data imprinting device with allowing downsizing of the camera.

The present disclosure relates to the subject matters contained in Japanese Patent Applications No. HEI 10-362615 and No. HEI 10-362761, both filed on Dec. 21, 1998, which are expressly incorporated herein by reference in their entireties.

What is claimed is:

1. A data imprinting device for camera, said camera being provided with a sprocket that engages feed holes of a film, comprising:

a shaft that rotatably supports said sprocket;

a light emitting device that emits a plurality of light beams, said light emitting device being provided to said shaft, an optical path being defined, in said shaft, from said light emitting device toward said film; and an optical system that is provided within said optical path that converges said plurality of light beams onto said film.

2. The data imprinting device according to claim 1, further comprising another sprocket which is also driven to rotate as said film is fed, and a film feeding amount detection system which detects a feeding amount of said film in accordance with a driven amount of said another sprocket.

3. The data imprinting device according to claim 2, further comprising another shaft that is integrally formed with said another sprocket, said shaft and said another shaft being co-axially arranged along a rotational axis thereof.

4. The data imprinting device according to claim 3, wherein said light emitting device is provided at an end portion, along said rotational axis, of said shaft.

5. The data imprinting device according to claim 4, wherein said shaft extends in parallel with a film surface, an opening being formed on said shaft at a portion facing said film surface, said light beams emitted by said light emitting device proceeding along an axis of said shaft, said optical system including a deflecting member which deflects said light beams emitted by said light emitting device toward said film surface via said opening.

6. The data imprinting device according to claim 1, wherein said light emitting device comprises a light emitting diode.

7. The data imprinting device according to claim 1, wherein said light emitting device includes a plurality of light emitting elements which are arranged such that beam spots formed on a film surface are arranged in a width direction of said film.

8. A data imprinting device for camera, comprising:

first and second sprockets engaging feed holes formed on both sides, in a width direction, of a film;

a first shaft that rotatably supports said first sprocket;

a second shaft that supports said second sprocket;

a light emitting device arranged between said pair of sprockets, said light emitting device emitting a plurality of light beams; and an optical system that is provided between said light emitting device and said film, said optical system converging said plurality of light beams on said film.

9. The data imprinting device according to claim 8, wherein said camera includes a body having a film winding section provided with a film winding spool, and a central portion including at least a shutter mechanism, and wherein said light emitting device and said optical system are provided between said film winding section and said shutter mechanism.

10. The data imprinting device according to claim 8, wherein said second shaft rotates integrally with said second sprocket, said second shaft being connected with a film feeding amount detection system which detects a feeding amount of said film in accordance with the driven amount of said second shaft rotated together with said second sprocket.

11. The data imprinting device according to claim 8, wherein said light emitting device comprises a light emitting diode.

12. The data imprinting device according to claim 8, wherein said light emitting device includes a plurality of light emitting elements which are arranged such that the beam spots formed on a film surface are arranged in a width direction of said film.

13. A camera, comprising:

a sprocket engaging feed holes of a film:

a shaft that rotatably supports said sprocket;

a light emitting device that emits a plurality of light beams, said light emitting device being provided to said shaft, an optical path being defined, in said shaft, from said light emitting device toward said film; and an optical system that is provided within said optical path and converges said plurality of light beams on said film to form a plurality of beam spots thereon.

14. A camera, comprising:

first and second sprockets engaging feed holes formed on both sides, in a width direction, of a film;

a first shaft that rotatably supports said first sprocket;

a second shaft that supports said second sprocket;

a light emitting device arranged between said pair of sprockets, said light emitting device emitting a plurality of light beams; and an optical system that is provided between said light emitting device and said film, said optical system converging said plurality of light beams on said film.

* * * * *